United States Patent [19]

Harris et al.

[11] 4,154,415
[45] May 15, 1979

[54] MODULATING VERNIER FLAP CONTROL SYSTEM

[75] Inventors: Charles V. Harris, Cerritos; George A. Schlanert, Tustin, both of Calif.

[73] Assignee: The United States of America as represented by the Secretary of the Air Force, Washington, D.C.

[21] Appl. No.: 866,144

[22] Filed: Dec. 30, 1977

[51] Int. Cl.² .................................................. B64C 13/02
[52] U.S. Cl. ................................ 244/83 C; 74/471 R; 74/491; 74/534; 244/83 F; 244/83 K; 244/211
[58] Field of Search ............... 244/83 C, 83 F, 83 G, 244/83 H, 83 K, 83 E, 210, 211, 213, 75 R, 85; 74/533, 534, 471 R, 491; 200/61.54, 56 R; 116/124 R, 124 A, 124 C

[56] References Cited

U.S. PATENT DOCUMENTS

| | | | |
|---|---|---|---|
| 1,987,066 | 1/1935 | Kingston | 244/83 F X |
| 2,279,612 | 4/1942 | Blass et al. | 244/83 R |
| 2,609,165 | 9/1952 | Hill | 244/85 X |
| 2,665,084 | 1/1954 | Feeney et al. | 74/471 X |
| 2,774,555 | 12/1956 | Crawford et al. | 244/85 X |
| 2,974,908 | 3/1961 | Platt | 244/83 J |
| 3,358,949 | 12/1967 | Harrison | 244/83 E |
| 3,636,321 | 1/1972 | Kirschner | 244/181 X |
| 3,681,580 | 8/1972 | Gwathmey et al. | 244/183 X |
| 3,710,644 | 1/1973 | Downing et al. | 74/533 X |
| 3,822,047 | 7/1974 | Schmidt | 244/181 |
| 3,850,388 | 11/1974 | Olcott et al. | 244/75 R |

Primary Examiner—Barry L. Kelmachter
Attorney, Agent, or Firm—Joseph E. Rusz; Arsen Tashjian

[57] ABSTRACT

A slat and modulatable flap control system for an aircraft having slats in the leading edge of the wing and having flaps in the trailing edge of the wing. A detent pin on a control handle, and any one of four detent slots on a detent crank, can be engaged to selectively, and automatically, set the flaps and the slats (because of the cooperative action of other constituent components of the control system) in optimum positional relationship for takeoff/"go-around," cruising, approach, and landing of aircraft. The control system is ideally suited for aircraft used in "short takeoff-and-landing" situations.

3 Claims, 7 Drawing Figures

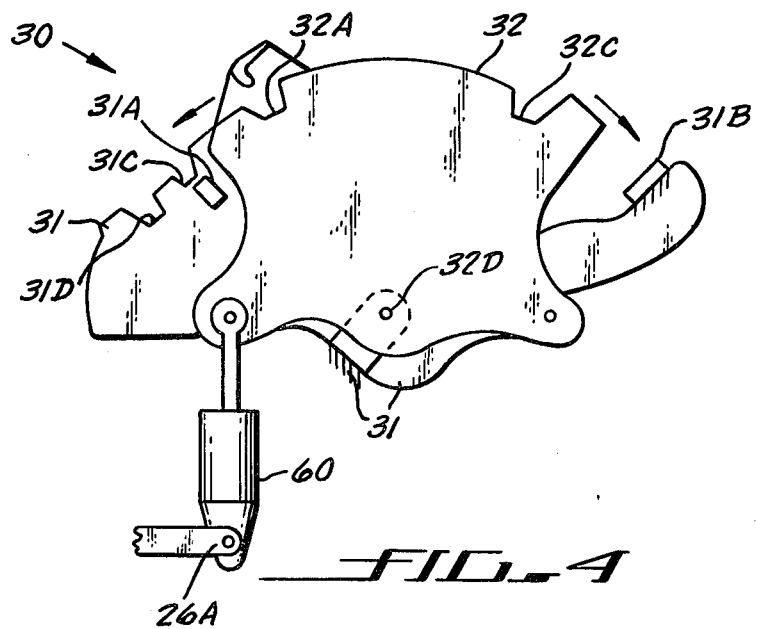
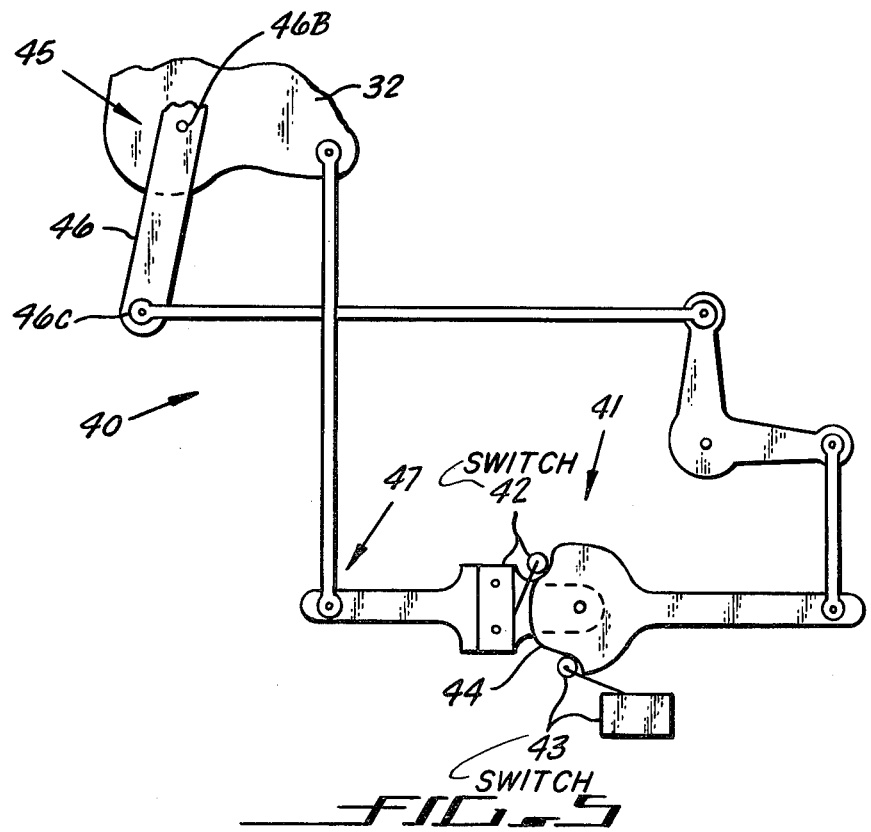

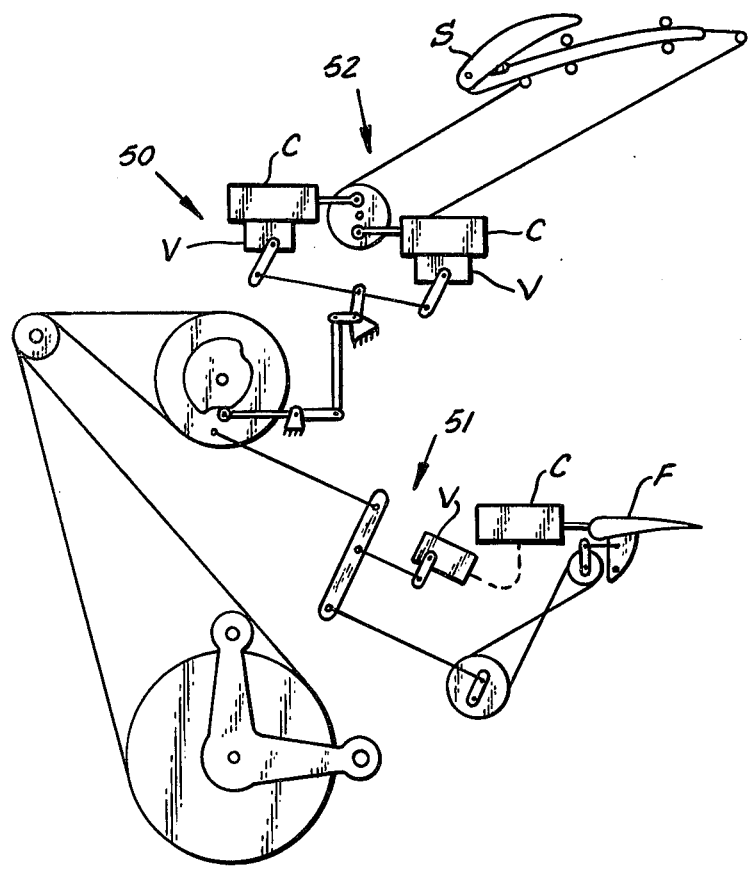
FIG_6

MODULATING VERNIER FLAP CONTROL SYSTEM

STATEMENT OF GOVERNMENT INTEREST

The invention described herein may be manufactured and used by or for the Government for governmental purposes without the payment of any royalty thereon.

CROSS REFERENCE TO RELATED PATENT

The modulating vernier flap control system taught herein is an improvement over the control setting apparatus that is described, shown and claimed in U.S. Pat. No. 3,710,644, issued on Jan. 16, 1973. In an oversimplified sense, the basic functional difference between that apparatus and the control system taught herein is that the patented apparatus does not address itself to the problems either of landing approach or of "go-around." This difference, as well as structural differences and other functional differences, will be further discussed more specifically later herein, as appropriate.

BACKGROUND OF THE INVENTION

This invention relates generally to a flight control system for use with an aircraft having slats in the leading edge of the wings and flaps in the trailing edge of the wings. More particularly, this invention provides for the minimizing of problems encountered by such aircraft during landing and "go-around" in "short takeoff-or-landing" (hereinafter referred to as STOL) operations.

Some of the most difficult problems for any aircraft occur during the landing phase. The flight path is affected by the wind, aircraft gross weight, engine power settings, pitch attitude and many other factors. These problems become even more critical during a STOL landing, with the steeper approach angle and short fields. Military STOL operation must also contend with ground fire and less than optimum weather information. "Go-around" under these conditions, especially with an engine out, can be critical. The correct "go-around" flap setting, particularly at high gross weights, is very necessary.

Therefore, it is very desirable to be able to compensate for as many of these adverse conditions as possible, so that the pilot's work load, which already is great, is not increased.

Additionally, certain military tactical situations may also demand near optimum takeoff performance. Precise flap settings are necessary to obtain adequate safety margins.

The vernier flap detent apparatus disclosed in U.S. Pat. No. 3,710,644, previously referred to herein, permits the precise setting of takeoff flaps, but does not address the landing approach or "go-around" problems.

We have invented a modulating vernier flap system (hereinafter referred to as "a slat and modulatable flap control system") that provides for and minimizes these problems, and other related thereto.

Therefore, we have significantly advanced the state-of-the-art.

SUMMARY OF THE INVENTION

This invention provides for a unique flight control setting apparatus which, when used in an aircraft that has slats and flaps and that is involved in a STOL operation, eliminates or at least minimizes the problems that are inherent in a STOL landing approach and/or "go-around."

Accordingly, it is the principal object of this invention to teach the structure of such a flight control setting apparatus.

This principal object, as well as other related objects, of this invention will become readily apparent after a consideration of the description of the invention, together with reference to the Figures of the drawings.

DESCRIPTION OF THE DRAWINGS

FIG. 3A is a side elevation view, in simplified schematic form, of a constituent component (i.e., the selective setting means) of the preferred embodiment shown in FIG. 1; whereas.

FIG. 4 is a side elevation view, in simplified schematic form, of another constituent component (i.e., the adjustable detent crank), of the preferred embodiment shown in FIG. 2, as operatively connected to the detent setting mechanism shown in FIG. 3A;

FIG. 5 is a side elevation view, in simplified schematic form, of still another constituent component (i.e., the switch actuation linkage), of the preferred embodiment shown in FIG. 2, as operatively connected to the adjustable detent crank shown in FIG. 4; and, FIG. 6 is a side elevation view, in simplified schematic form, of yet other constituent components (i.e., the slat and flap drive control assemblies), of the preferred embodiment shown in FIG. 2, as operatively connected to the switch actuation linkage shown in FIG. 5.

DESCRIPTION OF THE PREFERRED EMBODIMENT

Figure 1:
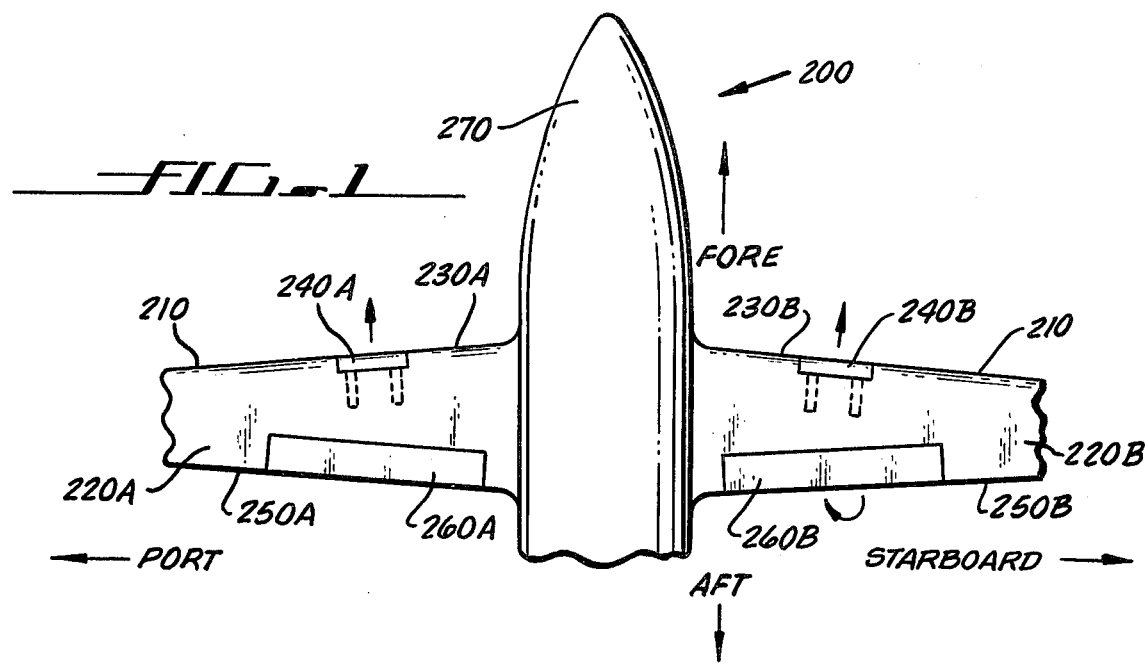
FIG. 1 is a top plan view, in simplified form and partially fragmented, of an aircraft having wing sections with slats and flaps.

With reference to FIG. 1, therein is shown, in a top plan view, in simplified form and partially fragmented, a type of aircraft 200 for which a preferred embodiment of our slat and modulatable flap control system has been adapted. This adaptation is merely by way of preference, and not because of any limitation. The aircraft 200 has at least one wing 210, wherein the wing 210 comprises a port wing section 220A and a starboard wing section 220B, with each wing section having a leading edge 230A (for wing section 220A) and 230B (for wing section 220B) with at least one slat (such as 240A for leading edge 230A, and 240B for leading edge 230B), and with each wing section having a trailing edge 250A (for wing section 220A) and 250B (for wing section 220B) with at. least one flap (such as 260A for trailing edge 250A, and 260B for trailing edge 250B). In this regard, it is to be noted that: conventional slats 240A and 240B each have only two positions (i.e., retracted, as shown in FIG. 1; and, extended, as indicated by the direction arrows); and, conventional flaps 260A and 260B are level (i.e., flush with the trailing edge) and are movable downwardly from that level position (as shown by the arc-like directional arrows), and upwardly from the down position to the level position. The movement of the flaps may be to an infinitely variable number of positions within the range of mobility, i.e., from level to completely down.

Also shown in FIG. 1 are: fuselage 270 of aircraft 200; and, to better orient the reader, the designations "Fore," "Aft," "Port" and "Starboard," together with respective directional arrows.

Figure 2:
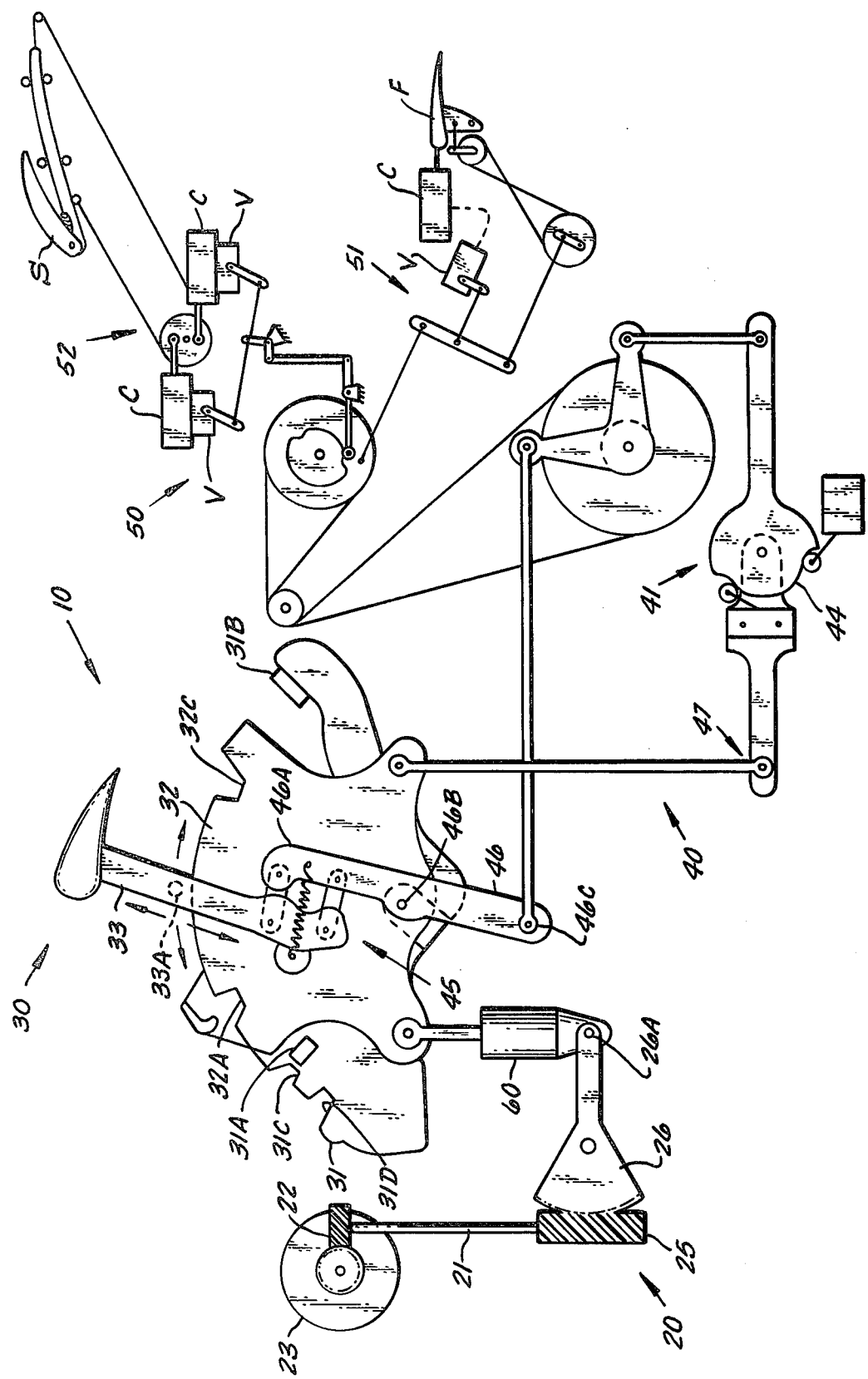
FIG. 2 is a side elevation view, in simplified schematic form, of a preferred embodiment of the invention.

In FIG. 2 is shown a preferred embodiment 10 of our invention, as adapted for incorporation in, and for use with, aircraft 200. The embodiment 10 is shown, in simplified form, in a side elevation view.

As can be seen in FIG. 2, the embodiment 10 of our slat and modulatable flap control system comprises: a means for selectively setting a pivotally movable member 32 having a plurality of detent slots therein, with this setting means generally designated 20; an adjustable detent crank assembly, generally designated 30, that is operatively connected to the setting means 20; a switch actuation linkage assembly, generally designated 40, operatively connected to the adjustable detent crank assembly 30; and, a flap and slat drive and control assembly, generally designated 50, operatively connected to the switch actuation linkage assembly 40. It is here to be noted that adjustable detent crank assembly 30 includes a plurality of members, such as first member 31 having a total of two detent slots (31C and 31D) therein and second member 32, having a total of two detent slots (32A and 32C) therein, with one member (i.e., a second member 32) pivotally movable and setable by setting means 20.

With, and by, the use of our inventive control system 10, the flaps 260A and 260B, FIG. 1, and the slats 240A and 240B, FIG. 1, may be set, selectively and automatically, to and at any one of the following four flaps-slats combinations: flaps level and slats retracted (for cruising); flaps level and slats extended (for approach); flaps partially deflected (downwardly) and slats extended (for takeoff and/or "go-around"); and, flaps partially to fully deflected (downwardly) and slats extended (for landing).

Figure 3A:
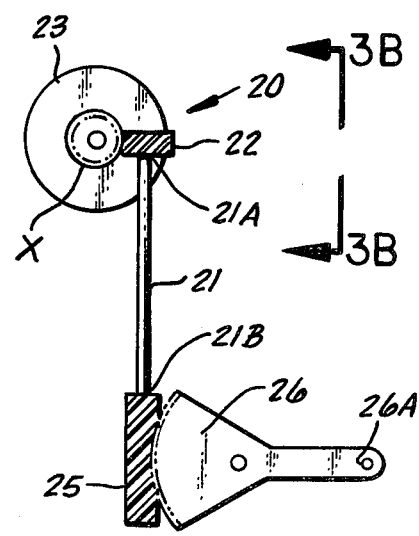
Figure 3B:
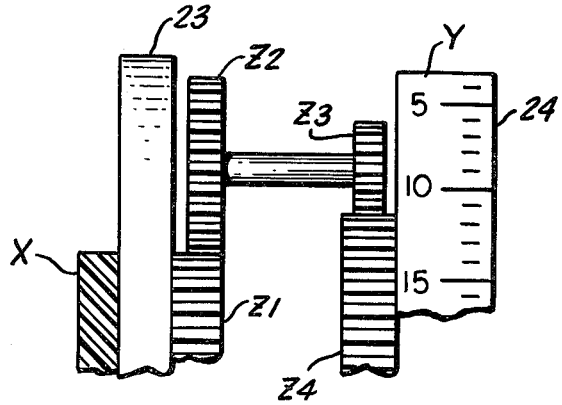
FIG. 3B is a front view along the line 3B—3B of FIG. 3A in simplified form and partially fragmented, of the driven wheel of that means.

Now, with reference to FIGS. 3A, 3B and 2, the means 20 for selectively setting a pivotally movable member (i.e., second member 32, FIG. 2) having a plurality of detent slots therein, includes: a shaft 21 having a first end 21A and a second end 21B, with a driver thumbwheel 23 disposed at the first end 21A, whereby the pivotally movable member 32, FIG. 2, may be set (i.e., is set) to a preselected position by a movement of the thumbwheel 23; a driven gear 22, FIGS. 2 and 3A (with indicia thereon, such as 24, FIG. 3B) that is in cooperative engagement with gear X attached to thumbwheel 23, whereby when thumbwheel 23 is moved the gear 22 is rotated. A driven wheel 24 is cooperatively engaged to thumbwheel 23 by gears Z, Z2, Z3 and Z4 whereby when the pivotally member 32 is set to the desired preselect position, the driven wheel Y (by way of indicia 24) indicates the preselected position of the pivotally movable member 32, FIG. 2; a worm drive 25 disposed at the second end 21B of the shaft 21, with the worm drive 25 being responsive to any movement of the driver thumbwheel 23; and, a worm wheel sector 26 in cooperative engagement with the worm drive 25, and with the worm wheel sector 26 having an arm portion 26A. (Ref. FIG. 3A.)

With reference to FIGS. 4 and 2, the adjustable detent crank assembly 30 that is shown therein in side elevation view, partially fragmented and in simplified form, includes: a first member 31, previously referred to herein, in the structural form of a pedestal having a plurality of detent slots 31C and 31D; a pivotally movable second member 32, also previously referred to herein, having a plurality of detent slots 32A and 32C, FIGS. 2 and 4. This second member 32 is in the structural form of an adjustable detent crank pivotally attached at pivot point 32D to the pedestal 31 and pivotally movable (as indicated by the arc-like directional arrows) between first pedestal stop 31A and second pedestal stop 31B, and with this second member 32 connected to the arm portion 26A of the worm wheel sector 26, FIGS. 2 and 3A, and adjustable to the desired preselected position by an appropriate movement of the driver thumbwheel 23, FIGS. 2 and 3A; and, a control handle 33, FIG. 2 (not shown in FIG. 4 to maintain simplicity of that drawing), that is pivotally attached to the second member 32 (i.e., the detent crank) by way of a lever member 46 (which will be discussed later herein) to which the control handle 33 is interlinked, with the control handle movable arc-like along the entire range of the detent slots and upwardly and downwardly with relation to member 46, crank 32, and the detent slots. The control handle 33 has a detent pin 33A, FIG. 2, complementary to, and selectively engageable with, each of the detent slots that are in the pedestal 31 and that are in the detent crank 32, such as detent slots 31C, 31D, 32A and 32C, FIG. 4. It is here to be noted that control handle 33, as shown in FIG. 2, is in its upward, rather than downward, position. It is also to be noted: that detent slot 31D is the slot engaged for cruising the aircraft, i.e., flaps level and slats retracted; that detent slot 31C is the slot engaged for approach with the aircraft, i.e., flaps level and slats extended; that detent slot 32A is the slot engaged for takeoff/"go-around" with the aircraft, i.e., flaps partially deflected (downwardly) and slats extended, and that the detent slot 32A can be adjusted from 5° flap to 25° flap; and, that detent slot 32C is the slot engaged for landing the aircraft, i.e., flaps partially to fully deflected (downwardly) and slats extended, and that the detent slot 32C can be adjusted from 25° flap to 50° flap.

Now, with reference to FIGS. 5, 2 and 1, the switch actuation linkage assembly 40 shown therein in side elevation view, and in simplified form, includes means, generally designated 41, for sensing the detent slot engaged by the detent pin 33A, FIG. 2, on the control handle 33, FIG. 2, and also for sensing movement of the detent crank 32. This sensing means 41 comprises: a first switch 42 to sense when detent pin 33A, FIG. 2, is in the detent position 32A, takeoff/"go-around" position (FIGS. 2 and 4); a second switch 43 to sense when detent pin 33A (FIGS. 2 and 4) is in the detent position 31C, approach position (FIGS. 2 and 4); a cam member 44 in abutting contact with switches 42 and 43; means, generally designated 45, FIGS. 2 and 5, for linking the control handle 33, FIG. 2, to the cam member 44, FIG. 5, wherein linking means 45 includes a lever member 46 having a first end 46A, FIG. 2, an intermediate section 46B, FIGS. 2 and 5, and a second end 46C, FIGS. 5 and 2, with the first end 46A connected to the control handle 33, FIG. 2, and responsive to any movement of the handle 33, and with the intermediate section 46B pivotally attached to the pedestal 31, FIG. 2, and to the detent crank 32, FIGS. 2 and 5, and with the second end 46C operatively connected to the cam member 44, FIGS. 5 and 2; and, means, generally designated 47, FIGS. 5 and 2 for linking the detent crank 32 to the first switch 42.

In FIGS. 6 and 2 is shown the flap and slat drive and control assembly 50. As can be easily seen, the assembly includes a slat drive and control subassembly, generally designated 52, that is in operative association with the flap drive and control subassembly 51. "S" is a representative slat, such as 240A or 240B, FIG. 1; "F" is a corresponding representative flap, such as 260A or 260B; "C" denotes a cylinder; and, "V" denotes a valve. It is to be noted that, although the slat drive and control subassembly 52 is shown positioned above the flap drive and control assembly 51 in both FIGS. 6 and 2, the positioning in the drawing is merely one of convenience in showing the subassemblies; and, such positioning, is not intended to imply such a structural positional relationship. As has been previously stated, and shown in FIG. 1, slats are at the leading edge of the wing sections of the aircraft, and flaps are at the trailing edge of the aircraft.

Now, again with reference to FIGS. 2, 3A and 4, our slat and modulatable flap control system 10 further comprises a series actuator 60 (i.e., a limited authority actuator) interposed between, and operatively connected to, the arm portion 26A, FIGS. 4 and 3A, of the worm wheel sector 26 of setting means 20, and the pivotally movable second member 32 of the adjustable detent crank assembly 30. It is here to be noted that, after the pilot selects the initial setting of detent crank 32, based on aircraft weight and wind conditions, this initial setting can be modulated by the actuator 60 within its authority limits, e.g., plus or minus 5°.

MANNER OF OPERATION OF THE PREFERRED EMBODIMENT

The manner of operation of the preferred embodiment 10 of our invention can be easily ascertained by any person or ordinary skill in the art from the foregoing description, coupled with reference to the Figures of the drawings.

For others, it is sufficient to say in explanation: that the pilot selects the initial pivotal position of the detent crank 32 by use of the setting means 20 which is operatively connected to the adjustable detent crank assembly 30, of which the detent crank 32 is a constituent component; and, that thereafter the pilot moves the control handle 33 and engages its detent pin 33A with the appropriate one of the detent slots 31D, 31C, 32A and 32C, in accordance with the then-existing circumstances (i.e., detent slot 31D for cruising; detent slot 31C for the approach; detent slot 32A for takeoff or "go-around"; and, detent slot 32C for the landing), and that such engagement (detent pin 33A to selected detent slot 31D, 31C, 32A or 32C) automatically results in the correct flaps-and-slats combination (i.e., flaps level and slats retracted for cruising; flaps level and slats extended for the approach; flaps partially deflected and slats extended for the takeoff or "go-around"; and, flaps partially to fully deflected and slats extended for the landing) for that circumstance.

CONCLUSION

It is abundantly clear from all of the foregoing, and from the Figures of the drawings, that the stated principal object, as well as other related objects, of our invention have been achieved.

It is to be noted that, although there have been described the fundamental and unique features of our invention as applied to a preferred embodiment thereof, various other embodiments, variations, adaptations, substitutions, additions, omissions, and the like may occur to, and can be made by, those of ordinary skill in the art, without departing from the spirit of our invention.

What is claimed is:

1. A slat and modulatable flap control system for use with an aircraft having at least one wing, wherein said wing comprises a port wing section and a starboard wing section, with each wing section having a leading edge with at least one slat, and with each wing section having a trailing edge with at least one flap, comprising:
 a. an adjustable detent crank assembly which includes:
  (1) a first member, in the structural form of a pedestal, having two detent slots, a first pedestal stop, and a second pedestal stop;
  (2) a second member, in the structural form of an adjustable detent crank, also having two detent slots, with said second member pivotally attached to said first member and pivotally movable between said first and second pedestal stops of said first member;
  (3) and, a control handle pivotally attached to said second member and movable arc-like to any one of said detent slots of said first and said second members, wherein said control handle has a detent pin complementary to, and selectively engageable with, each of said detent slots of said first and said second members;
 b. means for selectively setting said pivotally movable second member of said adjustable detent crank assembly, wherein said setting means includes:
  (1) a shaft having a first end and a second end, with a driver thumbwheel disposed at said first end, whereby said pivotally movable second member is set to a preselected position by a movement of said thumbwheel;
  (2) a driven wheel, with indicia thereon, in cooperative engagement with said driver thumbwheel, whereby when said driver thumbwheel is moved and said pivotally movable second member is set to said preselected position, said driven wheel indicates the preselected position setting of said pivotally movable second member;
  (3) a worm drive disposed at said second end of said shaft, with said worm drive responsive to any movement of said driver thumbwheel;
  (4) and, a worm wheel sector in cooperative engagement with said worm drive, with said worm wheel sector having an arm portion connected to said pivotally movable second member;
 c. a switch sensing linkage assembly operatively connected to said adjustable detent crank assembly, wherein said switch sensing linkage assembly includes means for sensing the detent slot engaged by said detent pin on said control handle, and also for sensing movement of said pivotally movable second member of said adjustable detent crank assembly, wherein said sensing means comprises:
  (1) a first switch to detect takeoff/"go-around" setting;
  (2) a second switch to detect approach setting;
  (3) a cam member in abutting contact with said first and second switches;
  (4) means for linking said control handle of said adjustable detent crank assembly to said cam member, wherein said linking means includes a lever member having a first end, an intermediate section, and a second end, with said first end connected to said control handle and responsive to movement thereof, and with said intermediate section pivotally attached to said pedestal first member and to said pivotally movable second member of said adjustable detent crank assembly, and with said second end operatively connected to said cam member;

(5) and, means for linking said pivotally movable second member of said adjustable detent crank assembly to said first switch;

whereby said flaps and said slats may be set, selectively and automatically, to any one of four flaps-slats combinations of settings, wherein said combinations of settings include: flaps level and slats retracted; flaps level and slats extended; flaps partially deflected downwardly and slats extended; and, flaps partially to fully deflected downwardly and slats extended; and, wherein said setting to a selected one of said combination of settings is made by moving said control handle and said detent pin thereon to any one of four slots, consisting of said two detent slots of said first member and said two detent slots of said pivotally movable second member, and engaging said detent pin of said control handle with said selected slot.

2. A slat and modulatable flap control system, as set forth in claim 1, wherein a flap and slat drive and control assembly includes:
 a. a flap drive and control subassembly;
 b. a slat drive and control subassembly in operative association with said flap drive and control subassembly.

3. A slat and modulatable flap control system, as set forth in claim 2, wherein said control system further comprises a series actuator interposed between, and operatively connected to, said arm portion of said worm wheel sector of said setting means, and said pivotally movable second member of said adjustable detent crank assembly.

* * * * *